July 3, 1962 G. G. ENSIGN ET AL 3,041,819
OSCILLATING BALANCE WITH HAIRSPRING AND EXPANSION LIMITING MEANS
Original Filed April 15, 1952 3 Sheets-Sheet 2
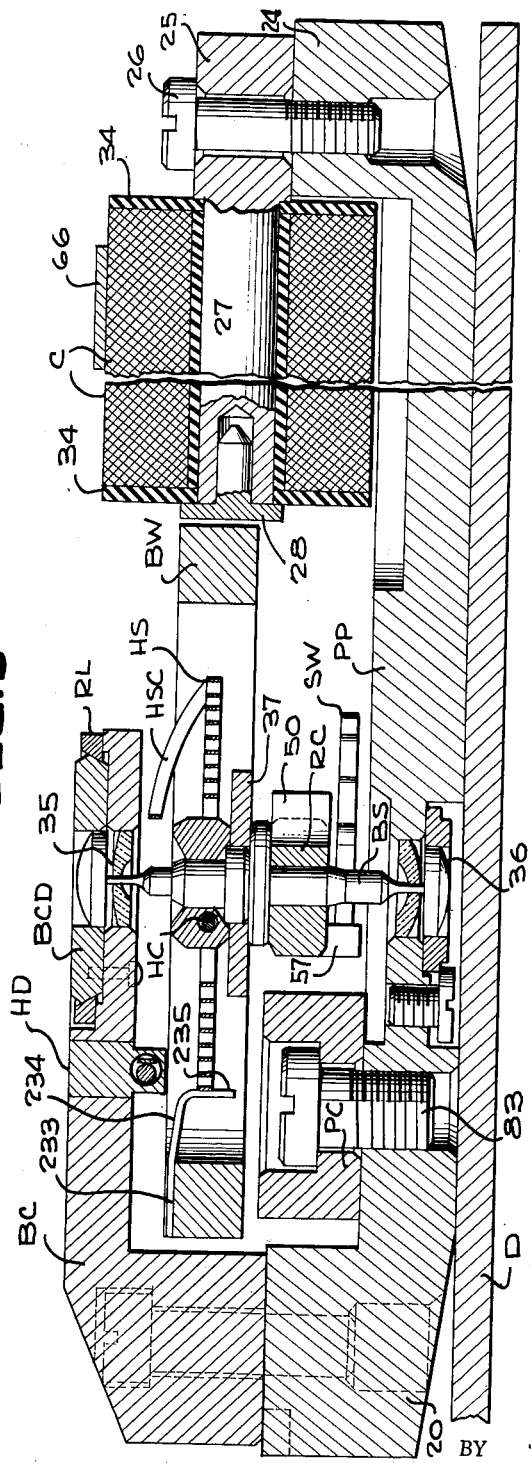
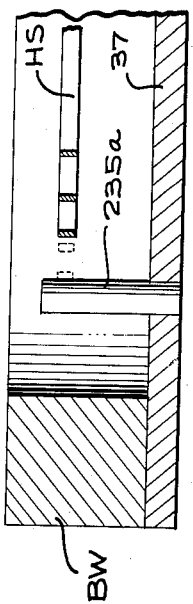
INVENTORS
G. G. ENSIGN,
G. T. SOPER &
O. LUNDAHL
BY Mason, Porter, Diller & Stewart,
ATTORNEYS July 3, 1962 G. G. ENSIGN ET AL 3,041,819
OSCILLATING BALANCE WITH HAIRSPRING AND EXPANSION LIMITING MEANS
Original Filed April 15, 1952 3 Sheets-Sheet 3

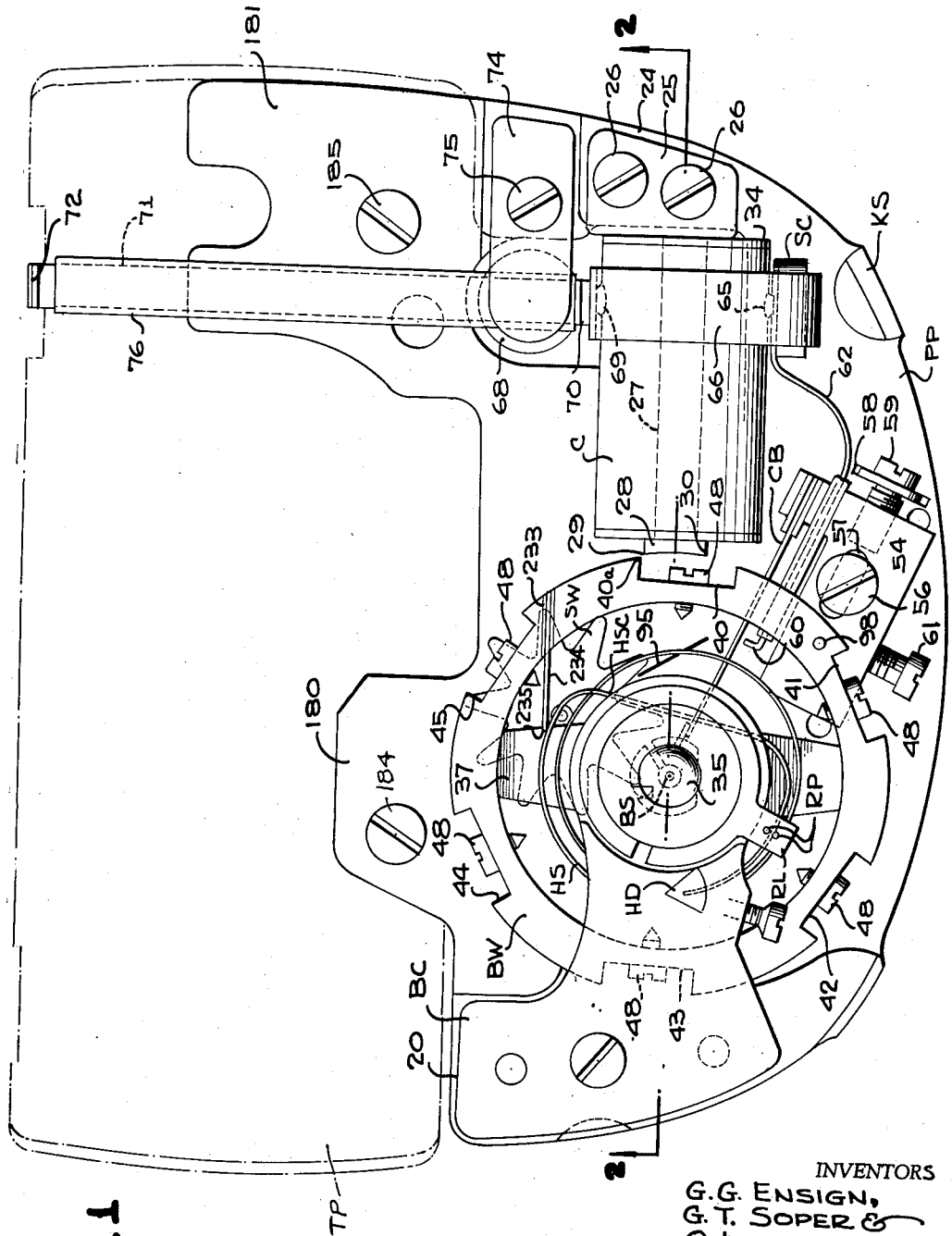

INVENTORS
G. G. ENSIGN,
G. T. SOPER &
O. LUNDAHL

BY

ATTORNEYS

United States Patent Office 3,041,819
Patented July 3, 1962

3,041,819
OSCILLATING BALANCE WITH HAIRSPRING AND EXPANSION LIMITING MEANS
George G. Ensign and Glenn T. Soper, Elgin, Ill., and Ossian Lundahl, Orlando, Fla., assignors to Elgin National Watch Company, Elgin, Ill., a corporation of Illinois
Original application Apr. 15, 1952, Ser. No. 282,388, now Patent No. 2,865,163, dated Dec. 23, 1958. Divided and this application Dec. 22, 1958, Ser. No. 782,329
6 Claims. (Cl. 58—28)

This invention relates to limiting devices for controlling the hairspring expansion of an oscillating balance assembly; and is of particular value with electrically actuated balances which are impulsed at a predetermined point in a stroke of operation and is effective therein for preventing excessive impulsing during a given stroke.

This application is a division of our copending application, Serial No. 282,388, filed April 15, 1952 now Patent No. 2,865,163; to which reference is made for structural assemblies including the devices herein claimed.

A feature of the invention is the provision of an oscillating balance assembly including a hairspring, and means for limiting the expansion of the hairspring.

Another feature of the invention is the provision of an electrically actuated timepiece including an oscillatory rate-determining member, contact devices controlled thereby to effect impulsing of the same, and means for restricting the amplitude of oscillation and thereby avoiding the successional delivery of false impulses with consequent continued excessive arcs of oscillation.

A further feature is the provision of a timepiece including an oscillatory rate-determining member and a hairspring coactive therewith, and an element carried in oscillation with said member and cooperative with the hairspring for applying a restrictive effect to said member during excessive arcs of motion thereof.

With these and other features as objects in view, as will appear in the course of the following description and claims, illustrative practices in accordance with this invention are shown in the accompanying drawings, in which:

FIGURE 1 is a plan view of the motor unit, seen from the balance cock side.

FIGURE 2 is a sectional view substantially on line 2—2 of FIGURE 1, on a somewhat larger scale.

FIGURE 3 is a sectional view through balance parts, showing a second form of overbanking control device.

Figure 4:
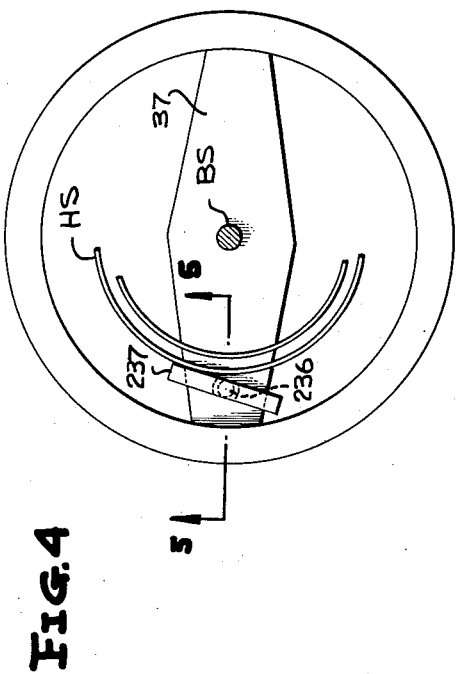
Figure 5:
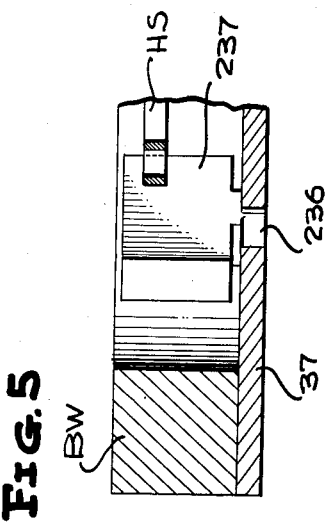

FIGURES 4-5 and 6-7 show further forms of overbanking control devices, respectively in plan and in section through balance parts: FIGURE 5 being substantially on line 5—5 of FIGURE 4; and FIGURE 7 correspondingly on line 7—7 of FIGURE 6.

The illustrative structure of FIGURES 1 and 2 has parts for an electrically actuated watch including a power unit base plate PP; a train sub-assembly mounted on a train unit base plate TP; and a dial D. The power base plate PP has case shoulders KS. The illustrated power unit base plate PP has two projections 180, 181 which overlap parts of the train unit base plate TP, so that the parts may be assembled in rigid relative position, prior to encasing, by the screws 184, 185.

The base plate PP of the motor sub-assembly is illustratively made of magnetizable material of low permanent magnetism, i.e., remanence. As shown in FIGURES 1 and 2, the base plate PP has upwardly extending portions 20, 24. On the projection 24 is fixedly mounted a block 25 which is held in position by screws 26 passing through holes of block 25 which are larger than the screw stems. Block 25 supports a core piece 27 at whose free end is a stator block 28 providing a pole face between the peripherally spaced edges 29, 30 thereof. In the example of execution the pole face 28 has an arcuate angle, relative to the balance system axis, of 16 degrees. In the illustrated form, the block 25, core 27, and stator block 28 are formed integrally of magnetizable material of low permanent magnetism.

A coil C is wound on the core 27 between the end washers 34.

A balance cock BC is secured (FIGURES 1 and 2) to the face of the projection 20 and carries the bearing 35 for one end of the balance staff BS, which is supported at its other end by a bearing 36 in the base plate PP.

The balance staff BS supports the diametrical crossarm 37 of the balance wheel having the rim BW made of magnetizable material of low permanent magnetism. This balance wheel rim BW has notches 40, 41, 42, 43, 44, 45; the notch 40 being shown adjacent the stator pole face 28, an illustrative position. The notches have the same peripheral dimension, which is greater in this form than the distance between the pole face edges 29, 30. The balance wheel notches receive the heads of the rating or poising screws 48 so that the heads thereof do not extend beyond the general rim periphery, whereby the mechanical clearance, i.e. the magnetic air gap, between the stator pole face 28 and the balance rim BW may be made very small. The notches 40 . . . 45 in the illustrative form each have an arcuate angle, relative to the balance system axis, of 24 degrees. The pole face 28 and notch 40 are so oriented, at the beginning of electrical impulse in the clockwise balance stroke, that the edge 29 is spaced about 2 arcuate degrees from the adjacent edge 40a of the notch 40.

The balance staff BS supports the hairspring collet HC to which is fixed the inner end of the spiral hairspring HS, which, at its outer end, is pinned in the hairspring stud HD. A regulator lever RL may be positioned on the dome BCD of the balance cock BC and have the regulator pins RP for engaging the hairspring at positions of adjustment near the hairspring stud HD. The hairspring HS is shown as a spiral having a so-called over-coil HSC displaced out of the main plane of the spiral in the usual fashion, wherewith the regulator pins RP (FIGURE 13) terminate short of the plane of the main part of the hairspring HS.

The balance staff BS receives a collet RC (FIGURE 2) having a radially projecting fin 50 for actuating the electric contact system, and made of sapphire or like abrasion-resistant material. The collet RC also carries the axially projecting jewel pin or roller 51 for moving the power take-off star wheel SW as described in the parent patent application.

The base plate PP supports a block 54 supporting one end of the electrical contact blade CB. A screw 56 passing through the slot 57 of block 54 engages in the base plate PP for binding the block 54 in its adjusted position. The movement of the block 54 relatively toward and from the balance staff BS is produced by a screw 59 engaged in the block 54 and having an enlarged head engaged in a notch 58 in the base plate PP.

This movement of the block 54 moves the contact blade CB essentially radially with respect to the axis of the balance staff BS, and controls the arc of overlap of the contact blade CB with the actuating fin 50 while these are in engagement. When this overlap is shortened, the time of engagement is less, and therewith the time of electrical conduction between the contact blade CB and its stationary contact 60; the length of the electrical impulse is shortened, and therewith the amount of energy delivered for magnetically impulsing the balance system. By increasing the overlap, the duration of the contact engagement is increased, and greater energy is supplied at each impulse.

The block 54 also has an insulated portion on which is insulatedly mounted the fixed contact blade 60 having one end bent angularly for engagement by the movable contact blade CB. The relative position of this end can be adjusted by the screw 61 mounted in the block 54. The blade 60 is illustrated as formed integrally with an extension portion 62 which bears against the terminal 65 on the coil C.

The other terminal 69 of the coil C is engaged by a conductive yoke 66 which extends arcuately over the coil C to a point opposite the terminal 65 and mechanically engages and holds the rectifier SC against the extension 62 so that this rectifier is electrically in shunt to the coil C. It will be noted that the yoke 66 imposes no lateral displacing force upon the coil. A spring clip 70 is formed as an upstanding end of a conductor strip 71 which extends across the train base plate TP and has a spring contact end 72 for engaging one terminal of the battery as described in the parent application. A clamping block 74 is held to the base plate PP by a screw 75 and presses a piece of insulation 76 against the conductor strip 71, and this in turn against the insulating block 68 which preferably is cemented onto the base plate PP.

Except for the contact clip ends 70, 72 and the portion engaged with the rectifier SC, the conductor strip 71 is insulated electrically, preferably by the coating 76 applied with thermo-adhesion heating before assembly, from the train base plate TP. The base plate PP supports a star wheel cock PC, held in place by a screw 83.

The balance wheel rim BW has a pin 98 for engagement by a balance stopping structure as described hereinafter. The balance rim BW has a chordal notch 233 in which is fixed a spring wire 234 that projects chordally inward (FIGURE 5) and has a down-turned inner end 235 (FIGURE 6) for engagement with the outer hairspring turn.

The connections of the electrical circuit, and the impulsing and operation of the motor parts, including the balance, are set out in the parent application. At each cycle, as the contact fin 50 encounters the contact blade CB during clockwise movement, this blade CB encounters the side contact 60, and the circuit is closed for energizing the coil C and thereby impulsing the balance so that it continues to oscillate, and therewith effects driving of the train. A witness mark 95 is shown in FIGURE 1, for permitting proper phasing of the transfer from the balance to the train, as described in the parent application.

It has been found desirable to provide means for controlling the amplitude of motion of the balance system.

In horological mechanisms having a pallet or the equivalent, the rate of the movement depends somewhat upon the arc traversed by any part of the balance during its oscillation. In particular, the length of the arc has an influence upon position error. It is customary to have a spring-driven watch, for example, oscillate in an arc of about one and five-eighths turns (585°) from standstill to standstill, when the mainspring is fully wound: with this arc decreasing during unwinding until the oscillation is about one and an eighth turn (405°) at the time when the spring barrel and mainspring have unwound for 24 hours or more. In such horological mechanisms, the energy input at impulsing can be adjusted to control the amplitude in various ways such as changing the mainspring, changing the adjustment of the escapement, etc. Motions in excess of one and five-eighths turns, e.g. as produced by shaking or twisting the same, are not necessarily harmful with a pallet, because the pallet fork has been moved by the roller pin at neutral axis and is held in its moved position by the escape wheel; and hence even if the roller pin performs a further arc of nearly 360° (total arc of nearly two turns), the roller pin may merely engage and rebound from the back of the pallet fork, and thus does not displace the pallet so that the fork will not properly receive the roller pin during the return stroke: and this excess of arc beyond the normal is rapidly consumed by friction because the energy of each impulse will be no greater than before.

With an electromagnetically actuated balance system, the frictional effects in the balance and train will vary from unit to unit, and there may likewise be variation in the batteries, both when new and during their effective lives. Thus, it is desirable to control the energy content of each impulse, and to prevent excessive amplitude of oscillation: noting especially that if an electrically-driven system swings for two turns (i.e. 360° past neutral axis), a second impulse is delivered.

One control of the energy content per impulse is that of adjusting the length of electrical contact through movement of the block 54 as described above.

One overbanking control has been described and illustrated in connection with FIGS. 1 and 2, and includes the wire end 235 acting upon the outer turn of the hairspring HS. With it, as the balance system swings through nonexcessive arcs, there is no contact of the wire end 235 with the hairspring and no stop function is exhibited even at the maximum expansion of the hairspring. As the arcs become undesirably high, the hairspring expansion brings its outer turn into the path of the wire end 235 as this travels with the balance rim, and a powerful frictional braking action results that rapidly damps the excess and arcs above the thus-predetermined desired maximum are not maintained. The parts can be manufactured for the desired maximum arc by locating the slot 233 at a proper part of the balance rim, and the final adjustment made by bending the wire 234.

Another overbanking control is illustrated in FIGURE 3, in which the diametrical arm 37 of the balance wheel BW carries a damping pin 235–a having a function like that of wire end 235.

In the modified form of overbank control shown in FIGURES 4 and 5, the arm 37 of the balance wheel rim BW tightly supports a pin 236 having a widened head 237 formed as a blade having equal masses at each side of the axis of pin 236: thus, rotation of the pin 236 and its head 237 has no influence upon the poising of the balance assembly, nor a significant effect upon the radius of gyration. By rotating the head 237 about the axis of the pin 236, it can be adjusted to a position in which it is encountered by the outer turn of the hairspring HS at the point when the balance assembly has made its maximum desired arc, and thus likewise exerts a braking action to prevent overbanking.

Figure 6:
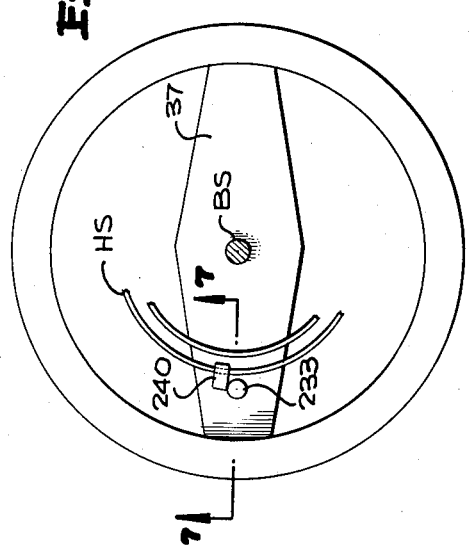
Figure 7:
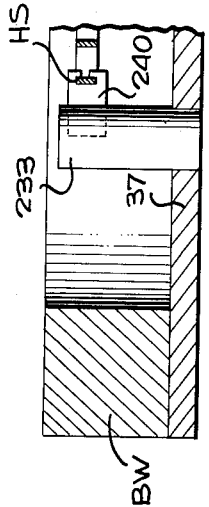

In the form of overbanking control shown in FIGURES 6 and 7, the arm 37 of the balance wheel rim BW carries a pin 233. The outer turn of the hairspring HS has a small block 240 fixedly secured thereto and of such a size and at such a position that this block passes the pin 233 whenever they approach under condition that the balance has made less than one and a half turns for example, being the motion determined as a desirable maximum. When the motion comes to maximum, however, the block 240 moves outward until it is in the path of the movement of the pin 233, and the parts thus engage and stop further movement of the balance wheel. It will be noted that this occurs beyond the normal point of standstill or turn-around in the balance motion, and hence the action occurs only when undesirable overbanking is present: and the parts have no effect upon motion below the pre-set maximum.

The foregoing description, and the accompanying drawings show illustrative forms of construction according to this invention, but it will be understood that these forms are not restrictive, and that the invention may be practiced in many ways within the scope of the appended claims.

What is claimed is:

1. In a timepiece, the combination of a support, a balance oscillatable on the support, a hairspring fixedly connected to the balance and to the support and effective in cooperation with the balance for determining the rate of oscillation thereof, an outer convolution of said hairspring being expanded in radius during each oscillatory stroke in one direction, electrical means for maintaining the balance in oscillation and including an electrical coil and a contact system with an actuator carried in oscillation synchronously with the balance for effecting momentary contact closure and energization of the coil as the balance swings past neutral axis at the center of a stroke whereby to deliver an impulse to the balance effective in the direction of its prevailing oscillatory stroke, and a device carried by the balance and moving therewith at a distance from the balance axis greater than that of the expansion of the said hairspring convolution during maximum normal amplitudes of oscillation of the balance, said distance being selected so that the device during an abnormally great oscillation amplitude of stroke in said one drection is brought into engagement with the said convolution of the hairspring consequent upon the abnormal expansion thereof whereby a restricting effect is produced upon the said device for preventing the balance and actuator from performing an oscillatory stroke of two turns and thereby effecting a false second contact closure near the end of an oscillatory stroke.

2. In a timepiece, the combination as in claim 1, in which the balance has a thick rim portion, the hairspring has an inner portion of spiral form located within the said rim, with an overcoil at the outer end of the hairspring and connected to the support, said overcoil extending chordally from said outer convolution, and said device is secured to the balance rim and extends inwardly therefrom and has a part extending into the plane of the said spiral portion.

3. In a timepiece, the combination as in claim 1, in which the balance has a thick rim portion and spokes, the hairspring has a spiral plane portion including said convolution and is located within the thick rim, and said device is a member carried by a said spoke.

4. In a timepiece, the combination as in claim 1, in which the said device is a piece of spring wire secured to the balance rim and extending chordally inward therefrom and having an angularly bent inner end for engagement with the said convolution upon abnormal expansion thereof.

5. A combination as in claim 1, in which the device is a T-shaped stud with its stem rotatable in but tightly held by the balance, said stud having its cross arms of essentially identical radii of gyration relative to the stud stem axis, whereby the rotation of said stud does not affect the poising of the balance assembly, said head being located in the plane of outer hairspring convolution and in its various rotated positions being effective to engage the hairspring at various arcs of oscillation.

6. In a timepiece, the combination as in claim 1, in which a projection is mounted on said convolution of the hairspring for detaining engagement with said device upon abnormal expansion of said convolution whereby to stop the device and balance against performing a stroke of two turns.

References Cited in the file of this patent

UNITED STATES PATENTS

| | | |
|---|---|---|
| 2,601,174 | Smith | June 17, 1952 |
| 2,632,292 | Amend | Mar. 24, 1953 |

FOREIGN PATENTS

| | | |
|---|---|---|
| 28,540 | Switzerland | July 17, 1903 |